(No Model.)  6 Sheets—Sheet 1.

F. A. WISWELL.
MACHINE FOR THE MANUFACTURE OF WIRE ROPE.

No. 276,317.  Patented Apr. 24, 1883.

Witnesses:
A. M. Long.
M. F. Halleck

Inventor
Frederick A. Wiswell
per Wiswell & Lange
Attys.

(No Model.) 6 Sheets—Sheet 2.

F. A. WISWELL.
MACHINE FOR THE MANUFACTURE OF WIRE ROPE.

No. 276,317. Patented Apr. 24, 1883.

Witnesses:
A. M. Long.
M. F. Halleck.

Inventor.
Frederick A. Wiswell
per Wiswell & Lange.
Attys.

N. PETERS, Photo-Lithographer, Washington, D. C.

(No Model.) 6 Sheets—Sheet 3.
F. A. WISWELL.
MACHINE FOR THE MANUFACTURE OF WIRE ROPE.
No. 276,317. Patented Apr. 24, 1883.
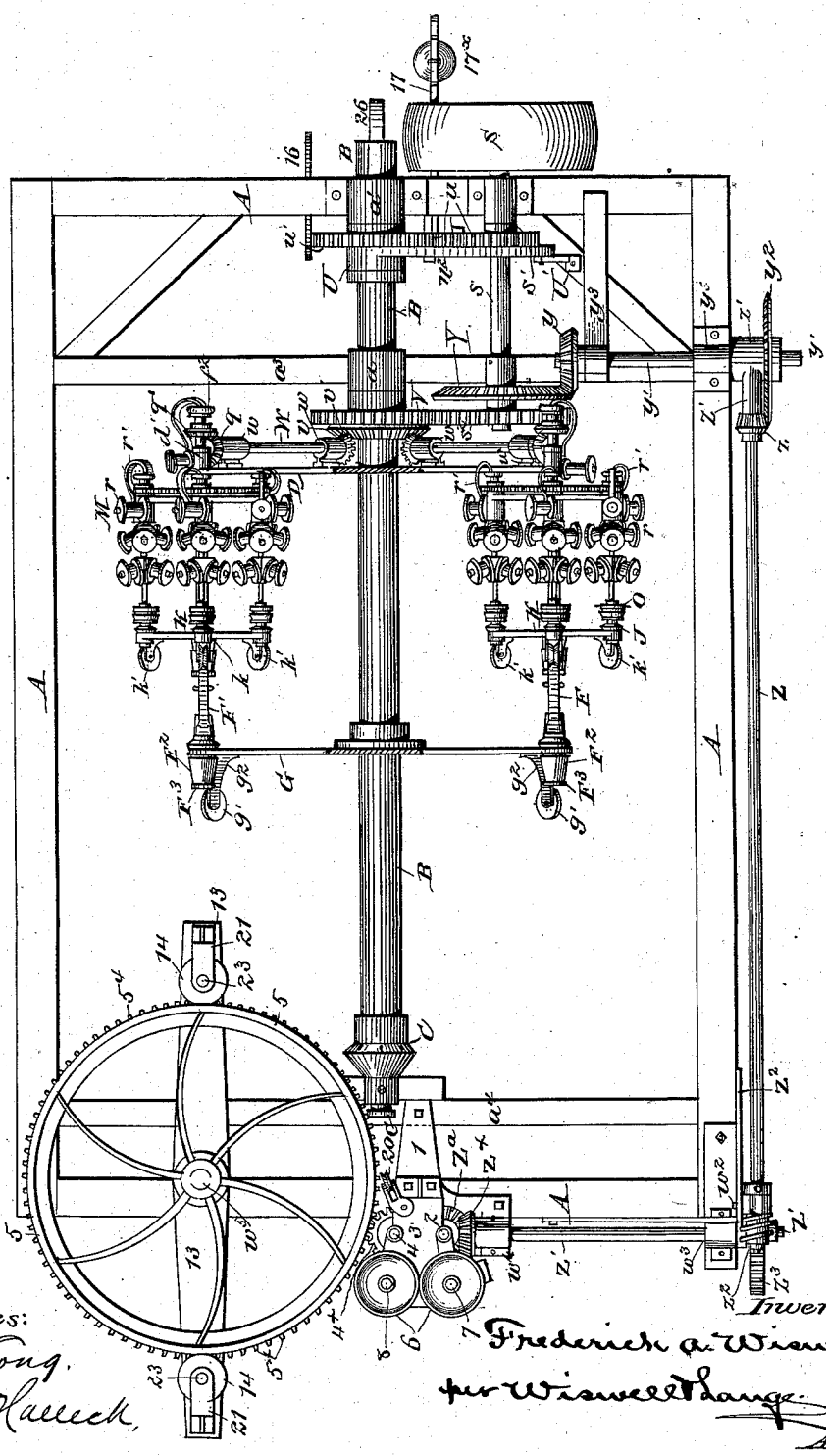

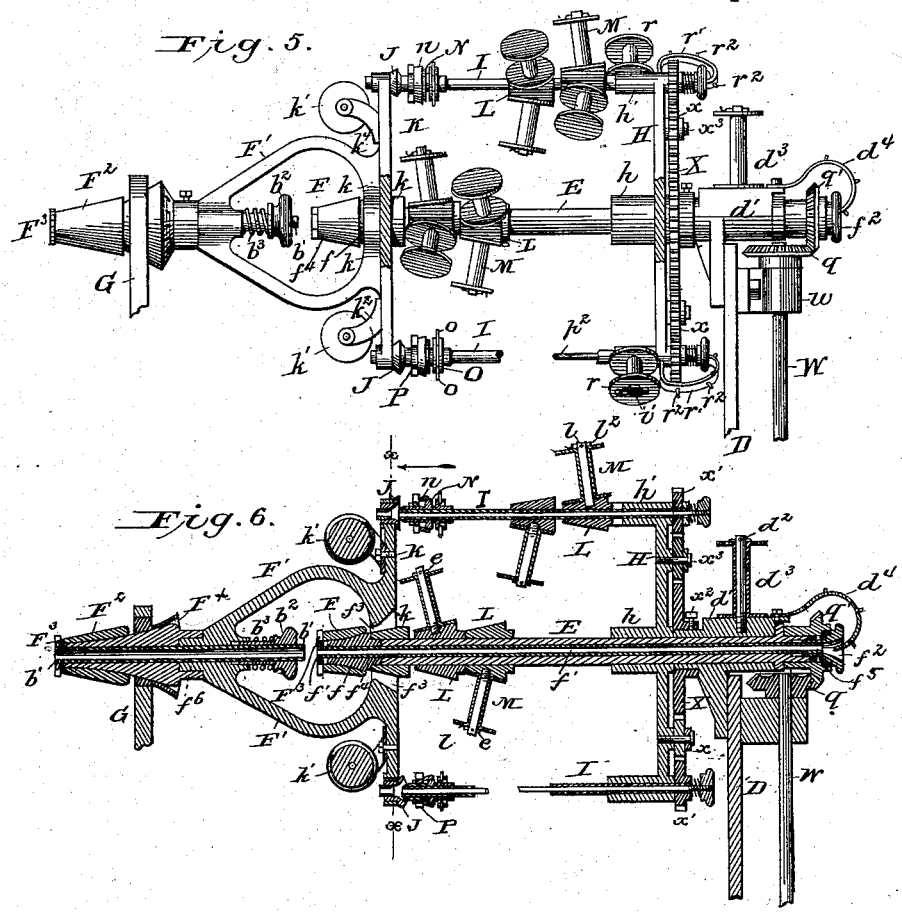

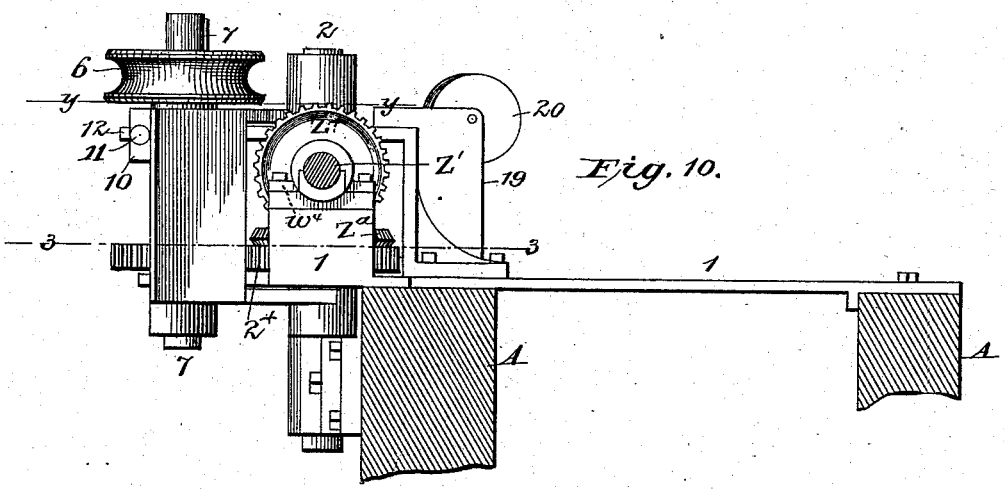

(No Model.)  6 Sheets—Sheet 6.
F. A. WISWELL.
MACHINE FOR THE MANUFACTURE OF WIRE ROPE.
No. 276,317.  Patented Apr. 24, 1883.
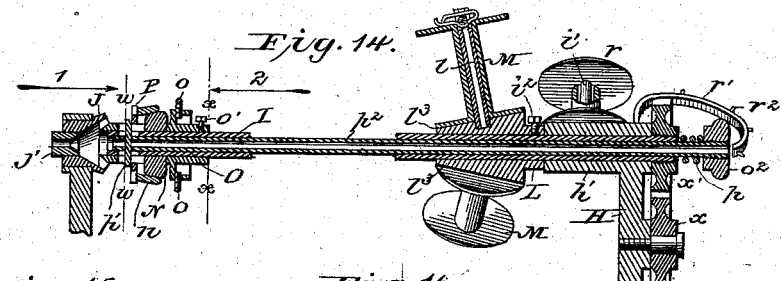
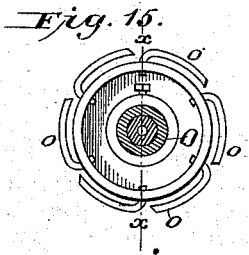
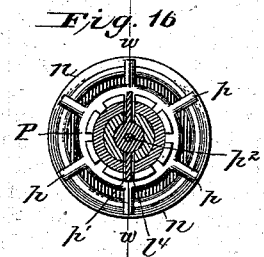
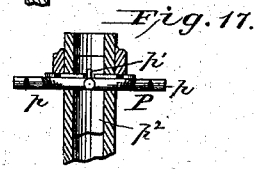
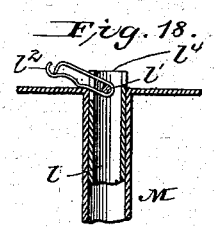
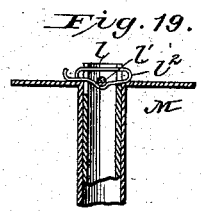
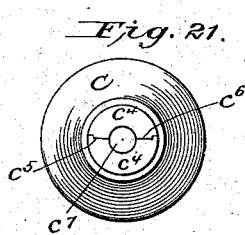
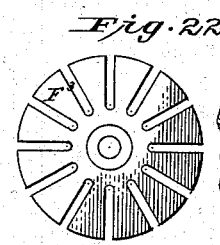
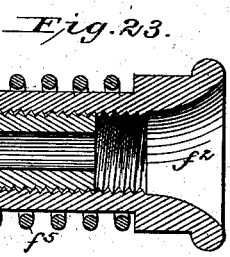
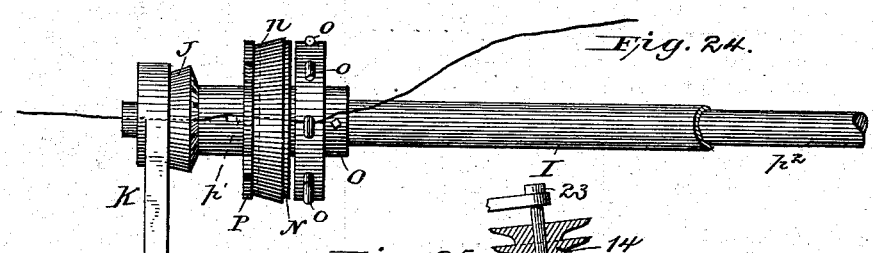
Witnesses:
A. M. Long.
M. F. Halleck
Inventor.
Frederick A. Wiswell
per Wiswell & Sanges
Attys.

UNITED STATES PATENT OFFICE.

FREDERICK A. WISWELL, OF BEEBE PLAIN, ASSIGNOR TO CHARLES C. COLBY, OF STANSTEAD, QUEBEC, CANADA.

MACHINE FOR THE MANUFACTURE OF WIRE ROPE.

SPECIFICATION forming part of Letters Patent No. 276,317, dated April 24, 1883.

Application filed July 11, 1882. (No model.)

*To all whom it may concern:*

Be it known that I, FREDERICK ALONZO WISWELL, a citizen of the Dominion of Canada, residing at Beebe Plain, in the county of Stanstead and Province of Quebec, Canada, have invented certain new and useful Improvements in Machines for the Manufacture of Wire Rope; and I do hereby declare the following to be a full, clear, and exact description of the invention, such as will enable others skilled in the art to which it appertains to make and use the same.

This invention relates to machines for the manufacture of wire rope, and has for its objects, first, to effect the manufacture of a rope or cable in which the strain applied thereto will be borne by all the wires; next, to obtain a superior working rope; and, lastly, to lessen the cost of manufacture.

The machine comprising my invention is capable of laying individual wires around cores to form cords; next, laying individual wires around cores to form strand-cores; next, laying the cords around the strand-cores to form strands; and, lastly, laying a number of the strands around a main or rope core to form the rope, all in one continuous operation. Further, my invention is capable of laying individual wires around cores to form cords; next, laying the cords around strand-cores to form strands; and, lastly, laying the strands around a main or rope core to form the rope, all in one continuous operation.

For a full understanding of my invention reference is made to the annexed drawings and to the following description and claims.

Figure 1:
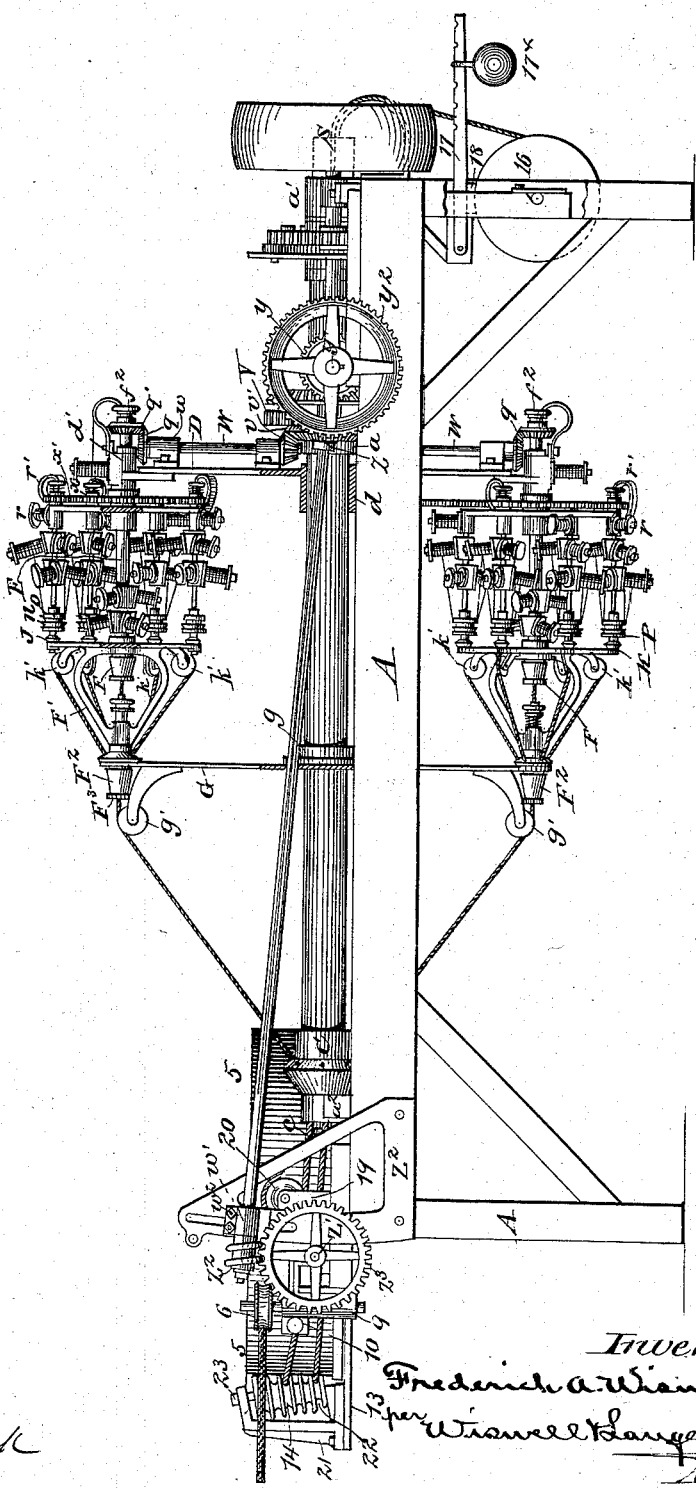
Figure 2:
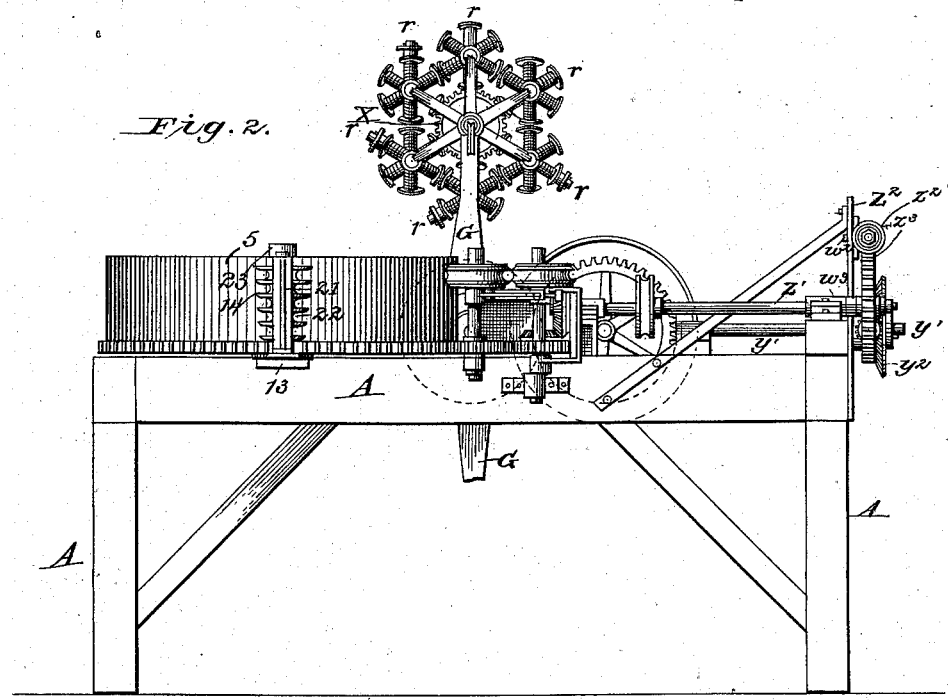
Figure 3:
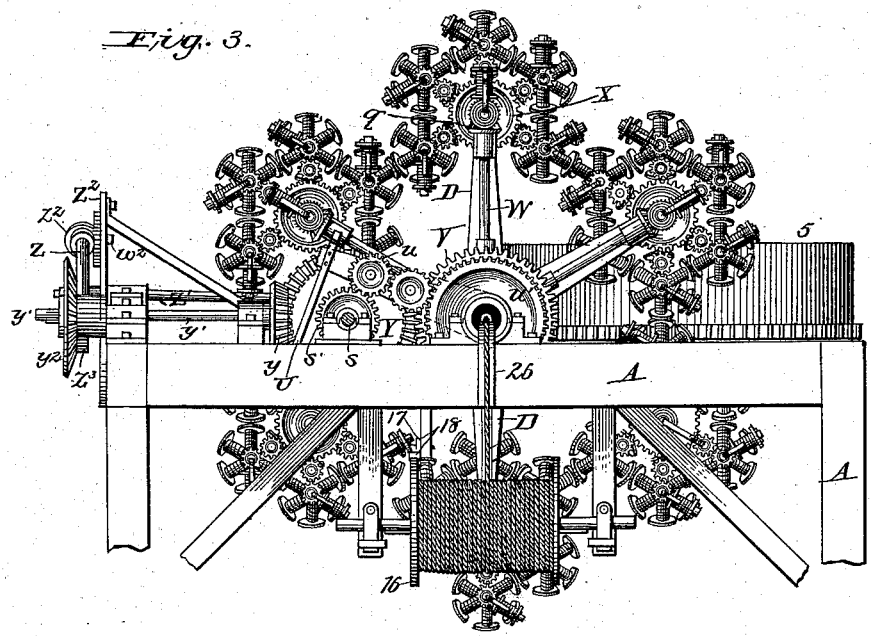

Referring to the drawings, Figure 1, Sheet 1, is a side elevation of my improved machine, some of the parts being broken away to more clearly illustrate the principal working portion of the same. Fig. 2, Sheet 2, is a front elevation of the machine, showing but one of the six general groups of mechanism. Fig. 3, Sheet 2, is a rear elevation thereof, the band-wheel and the weight to be placed on the friction-lever being removed. Fig. 4, Sheet 3, is a plan view of the machine, some of the parts being removed to more clearly illustrate the remaining portion. Fig. 5, Sheet 4, is a detail view of one of the general heads with four of the cord-shafts removed and another broken away to show the tube passing through the same. Fig. 6 is a longitudinal vertical section of Fig. 5. Fig. 7 is a transverse section of the "tiller-rope," showing the arrangement of the wires and cores. Fig. 8 is a similar view of the transmission-rope. Fig. 9 is an enlarged transverse vertical section on line $x\,x$ of Fig. 6, showing the extent of the hub $k$, with its arms K, and the arrangement of the openings $f^3$. Fig. 10, Sheet 5, is a detail view of part of the drawing-off mechanism as seen from the side thereof farthest removed from the drawing-off wheel. Fig. 11 is a sectional view of the same on line $y\,y$ of Fig. 10. Fig. 12 is a similar sectional view on line $z\,z$, Fig. 10. Fig. 13 is a front elevation of the parts shown in Fig. 10. Fig. 14, Sheet 6, is a longitudinal vertical section of one of the cord-shafts with accompanying mechanism. Fig. 15 is an enlarged transverse vertical section on line $x\,x$ of Fig. 14, looking in the direction of the arrow 2. Fig. 16 is a similar view on line $w\,w$, Fig. 14, looking in the direction of the arrow 1. Fig. 17 is a sectional detail view of a part of one of the cord-shafts, showing the slotted tube with the key $p'$ projecting through the slot. Figs. 18 and 19 are details in section of a spool on a spool-arm, showing the positions of the parts in the act of securing said spool on the arm. Fig. 20 shows a detail view, in section, of the main laying-head and die. Fig. 21 is a front elevation thereof. Fig. 22 shows a front elevation of one of the spiders which act in connection with the strand-laying head. Fig. 23 is an enlarged sectional detail of part of the tube $f'$, with its thumb-nut and coil-spring, to show the arrangement of parts. Fig. 24 is an enlarged detail view of one of the cord-shafts I, showing the inclined path of the wire; and Fig. 25 is a sectional elevation of my improved truncated cone, showing in full lines its axial pin.

Corresponding parts in the various figures are denoted by similar characters of reference.

In the accompanying drawings, A marks a frame of suitable strength and dimensions to support the operating mechanism.

B is a central hollow shaft, having its rear end supported in bearings $a\,a'$, secured upon cross-pieces $a^3$ of the frame A, and its forward end held in the rope-laying head C, which in turn rests upon bearings $a^2$, attached to a cross-piece, $a^4$, forming part of the frame A. This rope-laying head C is made solid, or in the form of a shell, as convenience may dictate, and is provided with a number of oblique openings or passages, $c'$, and a central opening or bore, $c^2$, at its forward end, in line with the opening through the hollow shaft B. A die, $c$, is held in this bore $c^2$ by means of a set-screw, $c^3$, passing through the rope-laying head C and into said die $c$. The die $c$ is formed of longitudinal sections, in the present instance of two pieces or halves, $c^4$, one of which is provided with a depression, $c^5$, in its face, extending its length, to receive the other half, having a corresponding projection, $c^6$, so that the parts will register to form a cylinder when placed in the rope-laying head. The die $c$ has a central opening, $c^7$, throughout its length, of a diameter equal to that of the rope which is to pass through it. Further, the opening $c^7$ of the die $c$ is flared at the rear end, as at $c^8$, as particularly shown in Fig. 20, so that the strands passing from the strand-laying head $F^2$ through the oblique openings $c'$ in the rope-laying head will impinge against and be guided by such flared surface $c^8$ to the rope-core in said die, and thus be laid evenly around said rope-core to form the rope. When different-sized ropes are made, dies $c$ having correspondingly-sized openings, $c^7$, are used. The purpose of forming the dies $c$ in longitudinal sections, $c^4$, is to permit said sections to be inserted into the rope-laying head C without cutting the rope-core or the rope itself, which passes through said rope-laying head to the drawing-off mechanism. One object for providing the depression $c^5$ and projection $c^6$ in the sections $c^4$ of the die $c$ is to prevent sidewise play of the sections should they not fit snugly in the bore $c^2$ of the rope-laying head C, also to cause the circumferential surface of the central opening, $c^7$, of the die $c$ to be always preserved, and thus prevent damage to the rope that might otherwise occur from abrasion against the sharp edges of the sections of said dies. The die $c$ may be provided with a collar, $c^9$, integral therewith, at its outer end, to limit its insertion into the bore of the rope-laying head C.

A hub, $d$, secured to the shaft B, has a number of radial arms, D, each provided at its extremity with a sleeve, $d'$, to receive a hollow shaft, E, known in this connection as the "strand-shaft," the forward end of which is secured in the hub $k$. The strand-core-laying head F is composed, first, of a piece, $f$, (see Figs. 5 and 6;) shaped somewhat similar to a truncated cone, with a reduced portion to fit in the hub $k$, and having a central bore; and, secondly, of a sleeve, $f^4$, conforming to the outer surface of said piece $f$ and free to rotate thereon. The sleeve $f^4$ is held to the piece $f$, and the latter in the hub $k$ and against the shaft E, by means of the tube $f'$, screwing into the spider $F^3$, which presses against said sleeve $f^4$. (See Fig. 6.) Said tube $f'$ extends rearwardly through said hollow shaft E, and receives an interiorly screw-threaded thumb-nut, $f^2$. (See Fig. 23.) A coil-spring, $f^5$, encircles the nut $f^2$ between the shoulder of said thumb-nut $f^2$ and the end of shaft E, so that when said thumb-nut is screwed up the pressure exerted on the wires between the sleeve $f^4$ and the piece $f$, composing the strand-core-laying head F, will be yielding, to permit any irregular surfaces on the wires to pass through said strand-core-laying head F, and thus prevent breakage of the wires. The hub $k$ is provided with openings $f^3$, as shown in Fig. 6, to direct the wires from the spools to the laying-head F.

The spider $F^3$, having the slots, as shown in Fig. 22, is designed, in connection with the guideways or grooves in the laying-head, to keep the wires out of contact with one another and insure their proper laying around the core.

The hollow shaft E is provided with spool-carriers L, having spools M, the latter being held to the arms $l$ of the former by means of spring-buttons $e$, the said spool-carriers L, spools M, arms $l$, and spring-buttons $e$ being in every respect similar to the like-recited parts on the cord-shafts I, to be presently described.

The sleeves $d'$ of the arms D, in which the shafts E freely revolve, are provided with arms or pins $d^2$, screwed therein, and carry core-spools $d^3$ and shields $d^4$, of like construction and arrangement as those on the sleeves of the arms H, arranged in connection with the cord-shafts I, as hereinbefore described.

Considered alone, the laid strand-core is produced in the following manner—viz: Upon imparting motion to the strand-shaft E from shaft W, arranged back of the arms D, as described hereinafter, the wires contained on the spools M of said strand-shaft will pass through the strand-core-laying head F and be laid around the core, which extends from the core-spool $d^3$ to and through the hollow strand-shaft E. Of course, in this operation of the machine, as well as in others, the wires must be drawn from the spools at a desired speed through the operation of the drawing-off mechanism. Two arms, F', extend in a curved manner forwardly from the hub $k$, and, joining at their forward ends, the reduced portion $f^6$ thereof enters the strand-laying head $F^2$ to support the latter in the manner shown in Fig. 6. In the present instance the arms F' are cast in one piece with the hub $k$ and its radial arms K, and, as stated hereinbefore, the openings $f^3$ are made through said hub. The strand-laying head $F^2$ is further supported and firmly braced as against lateral pressure in the end of the arm G, radiating from the hub $g$, secured to the hollow shaft B. With the exception that the strand-laying head itself contains openings $F^x$, as shown in Figs. 5 and 6, to direct the cords from the cord-laying heads, (to be set forth presently,) it is similar to the strand-core-laying head F, described hereinbefore, and is provided, also, with a spider, $F^3$, tube $b'$, thumb-nut $b^2$, and coil-spring $b^3$, corresponding with the spider $F^3$, tube $f'$, thumb-nut $f^2$, and spring $f^5$, connected with the strand-core-laying head F. By this construction a space is provided between the strand-core-laying head F and the rear end of the strand-laying-head mechanism, whereby adjustment of the latter can be made.

Journaled in a bracket, $g^2$, attached to the end of each of the radial arms G, is a grooved pulley, $g'$, the grooved surface of which is in line with the bore of the strand-laying head $F^2$, in order that the strands coming from the strand-laying heads will pass over said pulleys on their way to the rope-laying head C, and thus cause the strands to converge at the proper angle from the contact-surface of said grooved pulleys to the rope-laying head, instead of from the mouths of the strand-laying heads to said rope-laying head, whereby the working of the strand-laying heads will not be interfered with, nor such heads $F^2$ be subjected to lateral strain.

Firmly attached to each of the strand-shafts E, immediately in front of the sleeve $d'$ on the end of each of the radial arms D, is a hub, $h$, having a number of radial arms, H, the extremities of which are provided with sleeves $h'$ to receive hollow shafts I, termed the "cord-shafts," the outer end of each of which is firmly secured in any suitable manner in a cord-laying head, J, which has its forward end bearing in the end of one of the series of radial arms K proceeding from hub $k$.

The cord-laying head J is provided with a die, $j$, similar to die $c$, employed in the rope-laying head C, and is constructed in general in manner similar to said rope-laying head C. (See Fig. 14.)

Attached to a bracket, $k^2$, in each of the extremities of the arms K is a grooved pulley, $k'$, of the same construction and to serve the same purpose with relation to the cords as the grooved pulleys $g'$ do to the strands.

Held to the hollow cord-shafts I by means of set-screws $i^2$ or otherwise are the spool-carriers L, formed each of a hub, $l^3$, having three radiating hollow arms, $l$, inclining forwardly, or at an acute angle with relation to the longitudinal axis of the hub $l^3$, each arm provided with a pin, $l'$, passing transversely through it near the outer end thereof, and is further provided with two slots, $l^4$, in its end, opposite each other, as clearly seen in Figs. 18 and 19.

Loosely hung on the pin $l'$ of each of the spool-arms $l$ is a spring-button, $l^2$, formed of one piece of spring metal bent to form two parallel arms of different lengths, the end of the shorter of which is bent at right angles thereto to meet the surface of the other arm, which latter extends beyond said bent portion and is itself bent downward and then upward, so as to present a semicircular appearance. The longer arm is provided with a curved depression at about midway of its length, in which rests the pin $l'$ of the spool-arm $l$ when the spring-button is in position to hold a spool, M, on the spool-arm, as shown in Fig. 19. Further, the reversely-curved end of the longer arm of the spring-button presses on the disk of the spool to an extent to overcome the "spring" in the wire coiled thereon, and prevent the too rapid uncoiling of the wire when the machine is in operation. The object of inclining the spool-arms $l$, as described, is to permit the wires to be evenly fed from the spools to the hereinafter-described tension mechanism at about the proper angle, and prevent side play of the uncoiling wire against the coils on the spool, by which entanglement of the wire or its wedging or jamming with its coils on the spool is avoided.

By retaining the spool-holders L on the hollow cord-shafts I with set-screws $i^2$, I am enabled to so arrange the said holders that the spool-carrying arms will be radiated from the hollow cord-shafts in different lines, by which the wires will be fed to the cord-laying head J without danger of entanglement with one another.

Free to turn on the cord-shaft I at a point between the spools and the cord-laying head J is a disk, N, having an oblique or forwardly-inclined periphery, which receives a loose ring, $n$, constructed to conform to the inclined surface of the disk, as particularly described in Patent No. 244,974, dated August 2, 1881, as granted to Edward M. Ball and Frederick A. Wiswell.

Fastened with a set-screw, $o'$, to the cord-shaft I, immediately in rear of the loose disk N, is a collar, O, against which the disk abuts, and which is provided with a number of bent fingers, $o$, on its periphery, the purpose of which will be presently set forth.

P marks a follower arranged in front of the disk N, and having a number of radiating fingers, $p$, which serve, in connection with the bent fingers $o$, to lead the wires across the periphery of the disk and below the ring at an angle to the line of draft from the spools to the cord-laying head J, as shown in Fig. 24, to cause the disk N and ring $n$ to rotate slowly at different speeds, by which new surfaces of the parts will constantly be presented for wear, as clearly set forth in the patent hereinbefore mentioned. The follower P is held to the disk N by means of a key, $p'$, passing transversely through the hollow cord-shaft I, which is slotted, and through the tube $p^2$, which extends backwardly through the said cord-shaft and projects a short distance beyond, where it is exteriorly screw-threaded to receive a thumb-nut, $o^2$. A coil-spring, $p^x$, encircles the tube between the thumb-nut $o^2$ and the end of the cord-shaft. By screwing up the nut the tube carrying the key will be partially drawn through the cord-shaft to press the ring $n$ against the disk N to exert greater pressure on the wires passing between said ring and disk, by which the tensile strain is increased. The coil-spring $p^x$ allows the parts to yield to irregular surfaces in the wire; also, the threading of the wires between the disk and its ring is readily accomplished by unscrewing the nut to loosen the parts.

A stud or spool-carrying arm, $i'$, is screwed into the sleeve $h'$ on the end of the arm H, to receive a spool, $r$, filled with the wire or textile core for the cord, said arm $i'$ having the slots $l^4$, a pin, $l'$, and the spring-button $l^2$, as in the case of the arms of the spool-holders L of the cord-shafts I. The sleeve $h'$ of the arm H is also provided with a shield, $r'$, curved rearwardly and outwardly to pass around the gear $x'$ and thumb-nut $o^2$ at that point, and then reversely curved to bring its free end at the mouth of the tube $p^2$, so that the cord-core may pass from the cord-core spool $r$ along the surface of the shield $r'$, between the retaining-studs $r^2$ thereon, to and into the tube $p^2$, and thence pass by the key $p'$ at its forward end and through a small opening in the tube at that end to and through the cord-laying head, to be incorporated into the cord. In the present instance the hub $d$ has six radiating arms, D, each carrying at its end a hollow shaft, E, known herein as the "strand-shaft," which in turn carries a hub, $h$, having six radiating arms, H, which support each one end of the hollow cord-shafts that carry the spool-holders, as described.

Referring now to the driving mechanism, S marks a band-wheel to carry a belt from a suitable motor, whose shaft $s$ has a small spur-gear, $s'$, conveying motion through the pair of idle-gears $u$ to the gear-wheel $u'$, which is keyed to the hollow rope-shaft B to give motion to said shaft. The idle-gears $u$ are journaled to an arm, $u^2$, forming part of the sleeve U, encircling the main shaft, and free to turn thereon, carrying with it the arm $u^2$ and idle-gears $u$ to throw the main or rope shaft out of motion when desired. When in use the arm $u^2$, carrying the idle-gears $u$, is held to the standard U' by means of a bolt, as shown in Fig. 3, so as to insure the operation of the parts. A spur-gear, $s^2$, is keyed to the forward end of the shaft $s$, to mesh with the spur-gear V, loose on the main shaft B, immediately in front of the bearing $a$. Firmly secured to the spur-gear V, and in front thereof, is a bevel-gear, $v$, into which mesh the pinions $v'$, attached to the inner ends of the shafts W, which latter are held in bearings $w$, secured to the back of the radiating arms D, as clearly shown in the drawings. The outer end of each of the shafts W is provided with a miter-gear, $q$, meshing with a second miter-gear, $q'$, on the rear end of each of the strand-shafts E, to give motion to said shafts in a reverse direction to that of the main shaft B.

Held by a set-screw, $x^2$, to the sleeve $d'$, which supports the rear end of the strand-shafts E, is a spur-gear, X, with which meshes an idle-gear, $x$, secured with a journal-bolt, $x^3$, on the arm H, there being one of said idle-gears $x$ to each of the radiating arms H, and each gear $x$ in turn meshes with a pinion, $x'$, secured one to each of the cord-shafts I. From the fact that the gear-wheel X is held by the set-screw $x^2$ to the sleeve $d'$ of the arm D, that the idle-gears $x$ are held to the radiating arms H, and that the strand-shaft E, in rotating, carries the arms H around its axis, the gear-wheel X, fixed stationary with relation to the rotating strand-shaft E, will, when motion is imparted to said strand-shaft E from the shaft W, rotate the idle-gears $x$ on their axes and cause the pinions $x'$ to rotate the cord-shafts in an opposite direction to that of the strand-shafts. When the gear-wheel X is not held firmly to the sleeve, as set forth, it is free to rotate thereon, in which event the cord-shafts do not revolve on their own axes, but merely around the common axis of the strand-shaft. The object of causing the cord-shafts to revolve in an opposite direction to that of the strand-shafts and the strand-shafts oppositely to that of the main shaft will be presently shown.

A bevel-gear, Y, is keyed to the shaft $s$ and meshes with the bevel-pinion $y$, secured to one end of the shaft $y'$, journaled in bearings $y^3$, attached to the frame A, which receives at its other end a bevel-gear, $y^2$, meshing with a bevel-pinion, $z$, on the shaft Z, disposed at right angles to the shaft $y'$, and having its rear end held in one arm of a double sleeve, $z'$, whose other arm encircles the shaft $y'$. This construction permits play of that end of the shaft when the other end is raised or lowered for purposes to be presently set forth. The forward end of the shaft Z receives a worm, $z^2$, meshing with a worm-gear wheel, $z^3$, secured to a shaft, Z', disposed at right angles to the shaft Z. The shaft Z is supported at its forward end in a bearing, $w'$, adjustably secured by bolts $w^2$ in a slotted standard, $Z^2$, attached to the frame A at that point, to enable the vertical adjustment of said shaft when worm-gear wheels of different sizes are used. The shaft Z' has one of its bearings, $w^3$, secured to the frame A, and the other, $w^4$, to a plate, 1, itself fastened to the frame A.

A miter-gear, $Z^x$, is attached to the inner end of the shaft Z', and meshes with a second miter-gear, $Z^a$, keyed to the vertical shaft 2, having bearings in the plate 1, and the bracket 3, secured to the plate 1. Keyed to the said shaft 2, below the miter-gear, is a spur-gear, $2^x$, meshing with a similar spur-gear, $4^x$, arranged on a second vertical shaft, 4, held in bearings in the bracket 3 and plate 1, said spur-gear $4^x$ working in the teeth $5^x$, arranged on the bottom portion of the periphery of a large wheel, 5, horizontally arranged on the vertical shaft $w^5$, secured to the plate 13, which in turn is held to the frame A. This large wheel, which I term the "drawing-off wheel," is so arranged with relation to the bore in the main shaft B and the meeting edges of the drawing-rolls 6 (to be presently set forth) that its periphery will be about in line with said parts, so that as the rope comes from the rope-laying head C it may be coiled one or more times around the drawing-off wheel 5, and thence pass through the drawing-rolls 6 to a reeling device. By passing the rope issuing from the rope-laying head C one or more times around the drawing-off wheel 5, which is caused to rotate by the mechanism just described, and by keeping it taut thereon by means of the drawing-rolls 6, there will be sufficient friction between the rope and the drawing-off wheel 5 to prevent the former from slipping on the latter, and cause the wheel 5 to exert the necessary pulling or drawing strain on the rope to overcome the tension on the individual wires and draw the rope from the rope-laying head C at the required rate of speed.

The drawing-rolls 6 are removably held to the splined vertical shafts 7 and 8, one of said shafts having its bearings in the plate 1 and bracket 3, and the other being held in bearings forming part of a swinging frame, 9, hinged on the vertical shaft 2, as clearly shown in Fig. 11. The drawing-rolls 6 are intended not only to keep the rope taut on the drawing-off wheel, but also to compress the rope more or less, as is deemed advisable, to render it more compact and even, and to straighten out and remove any possible irregularities. When compressed by the rolls the rope is slightly increased in length, owing to such compression, and therefore I cause the said rolls to draw the rope from the drawing-off wheel 5 slightly faster than the wheel 5 draws it from the rope-laying head. This slightly-increased speed of the drawing-rolls is obtained by having the diameter of said rolls slightly greater than the diameter of the pitch-line of the gears on shafts 7 and 8, which carry said rolls. Were not this done—that is, increasing the surface speed of the rolls 6 over that of the wheel 5—the rope would soon become slackened on the drawing-off wheel 5, thereby rendering the latter quite useless for the purpose designated. After leaving the drawing-off wheel 5 and before reaching the drawing-rolls 6 the rope passes over a roll, 20, pivoted in an arm, 19, attached to the bracket 3, to guide said rope to the drawing-rolls, as shown. Since the drawing-off wheel 5 and drawing-rolls 6 are geared to and receive motion from a common shaft, Z', and thus have a fixed relative motion, the diameter of the rolls must be increased or diminished, according to the different sizes of rope to be made, so that the relative surface motion of the wheel 5 and rolls 6 will be preserved.

The swinging frame 9, carrying one of the drawing-rolls, is provided to permit drawing-rolls of different sizes having grooves of varying diameters to be placed on their respective shafts, as required for the various kinds of rope made.

I provide a swinging dog, 10, pivoted to the bracket 3, and having an adjusting-screw, 11, to engage with a stud, 12, projecting from the swinging frame 9. The swinging dog, with its adjusting-screw, is also intended to regulate the degree of compression of the drawing-rolls on the rope.

Pivoted in a bracket, 21, secured one to each end of the plate 13, projecting on opposite sides of the drawing-off wheel 5, is an inverted truncated cone, 14, having one or more grooves, 22, in its periphery, the bottom or working surface of each of which is cut at right angles to the longitudinal axis of said cone. The cones are arranged each upon an inclined axis, 23, in close relation to the periphery of the drawing-off wheel 5, so that as the rope is coiled one or more times around the said wheel it is passed through a groove in each of the cones 14, at relatively increased heights, in the direction of the rotation of the wheel 5, in order that the rope, passing onto the wheel 5 at its lower part, will, by the action of the grooved cones 14, be lifted at points around the periphery of said wheel to raise it a diameter, so that it will leave the wheel at a higher point to pass between the rolls 6, and thus prevent the rope winding on itself or becoming twisted or scraped on the surface of said wheel 5. The immediate object of providing an inverted truncated cone, 14, with the lower or working surface of its groove or grooves 22 at right angles to the axis 23 of said cone is to cause the rope to be lifted upward and outward from the drawing-off wheel 5. It will be noticed that the upward and outward lifting action of the cones at any one point is very slight, from the fact that the rope is merely lifted a diameter by the combined action of the cones, and that it is only necessary to partially overcome the binding action of the rope on the wheel 5 to permit of the upward lift. The outward lifting action of a cone is brought about by the arrangement thereof upon an inclined axial pin, whereby the grooves are presented at an angle to the periphery of the drawing-off wheel, so that as the wheel draws the rope from the rope-laying head the said rope bears on the edge or periphery of the bottom of a groove, and by the movement of the cone on its axial pin, as induced by the moving rope, moves onto the described bottom, thus bringing said edge at its highest point under the rope and partially between it and the wheel, and thereby lift the rope upward and slightly outward. Were the rope lifted or forced directly upward on the periphery of the drawing-wheel 5, the wires thereof would rub against one another and against the surface of the wheel and be damaged more or less, especially so with galvanized wire used in the manufacture of rope for ships' rigging. Besides, the rope itself, owing to its pressure on the wheel, would be twisted more or less. The number of cones 14, or the grooves 22 in the cones, may be varied as deemed necessary or advisable. After the rope leaves the drawing-rolls 6 it may be wound on a suitable reel attached to an extension of the frame A, or to a separate frame.

Secured to the rear end of the frame A is a reel, 16, arranged below and about in line with the bore of the main shaft B, said reel containing the rope-core, which is passed through the hollow shaft B and incorporated into the rope at the rope-laying head C. A lever, 17, pivoted to the frame A, has a friction-block, 18, which rests on one of the disks of the reel. Said lever is provided at its free end with a weight, 17×, capable of adjustment on the lever to regulate the amount of friction between the lever 17 and reel 16, so as to prevent a too rapid unwinding of the rope-core and give it more or less tensile strain to provide for its proper incorporation into the rope. The rope-core may be guided from the reel 16 to the bore of main shaft B by a shield, 26, as shown in dotted lines, Fig. 1, and in full lines, Figs. 3 and 4.

As now constructed and described, my improved machine is capable of making a rope for use as a bridge-cable, and also as a transmission or other rope, said rope being composed of six individual wires laid around a core to form what I term in this connection a "cord," six wires laid around a core to form a strand-core, six of the cords mentioned above laid around a strand-core to form a strand, and six strands laid around a bunch of straight wires, or a textile core to form the rope proper, as shown in Fig. 27.

The machine is also capable of making what is known in the trade as "tiller" or "steering" rope. This rope is made of six individual wires laid around a core to form a cord, six cords around a textile core to form a strand, and six strands around a textile core to form the rope, as shown in Fig. 26.

Assuming that the spools M are filled with wire of proper size, the core-spools $r$ $d^3$ filled with the required cores, the reel 16 contains the proper rope-core, and the wires drawn forward around the drawing-off wheel 5 and through the drawing-roll 6, the operation of the parts to effect the laying of the first-described rope will be as follows: Upon giving motion to the described driving mechanism the hollow cord-shafts I will be rotated around their axes, the individual wires will be drawn from the spools M on the spool-carriers L on said shafts, and, after passing through the described tension mechanism, enter the cord-laying heads J and be laid around the cord-cores, passing from the cord-core spools $r$ through the tubes $p^2$ in said hollow cord-shafts I to form the cords. While revolving around their own axes the cord-shafts I are also carried or caused to revolve in an opposite direction around the axes of the strand-shafts E. The rotation of the strand-shafts E on their own axes causes the cords passing from the cord-laying heads J over the rolls $k'$ and into the strand-laying heads $F^2$ to be laid around the strand-cores, which latter are laid simultaneously with the laying of the cords, and pass from the strand-core-laying heads F to the strand-laying heads $F^2$ to form the strand. Simultaneously with the revolution of the cord-shafts I around their own axes, their revolution around the axis of the strand-shafts E, and the revolution of the strand-shafts E around their axes, the main shaft B is rotated on its axis, which, carrying the radiating arms G D, supporting the strand-shafts E, causes the latter to rotate around the common axis of said main shaft B. Thus rotating, the strands, issuing from the strand-laying heads $F^2$ and passing over the rollers $g'$, contiguous thereto, to and into the rope-laying head C, are laid around the main or rope core to form rope, which, issuing from the die $c$ at the end of the main shaft B, passes around the drawing-off wheel 5 one or more times, as is found necessary, thence over the roller 20, through the drawing-rolls 6, and onto a suitable reel, in the meantime the inverted peripheral grooved truncated cones 14 acting to lift the rope on the drawing-off wheel 5, as described.

Instead of extending the wires from the main shaft B to and around the drawing-rolls 6, which quantity of wire would become so much waste material, the said wires could be attached to a hook or eye in the end of a rope, which latter would be passed around the drawing-wheel 5 and through the drawing-rolls 6, so as to effect the proper operation of the drawing mechanism in connection with the other parts of the machine. When the hook or eye in the rope reached the cones 14 the latter should be removed by withdrawing their axial pins 23 from their supporting-frames 21, and be replaced as soon as the hook is drawn past. The drawing-rolls 6 can also be adjusted to effect this object by means of the swinging dog 10, with its adjusting-screw 11.

The rotation of the cord-shafts I with relation to the strand-shafts E and of the latter with relation to the main shaft B is about two to one. However, since the cord-shafts I revolve in a reverse direction to that of the strand-shafts E and the latter in a reverse direction to that of the main shaft B, the gearing of said shafts is as three to one, to compensate for the lost revolution in each of the cord and strand shafts, caused by their reverse rotation relative to that of their preceding shafts.

The speed at which the rope is drawn off may be varied by placing a larger or smaller worm-gear wheel, $z^3$, on the shaft $Z'$, to mesh with the worm $z^2$, the shaft Z being vertically adjustable to permit this change of gears, as stated hereinbefore.

The speed of the drawing-off mechanism regulates the amount of twist in the rope, its strands, and cords, since by increasing the speed of the drawing-off mechanism and not changing the speed of the laying mechanism the rope is drawn off faster and the twist is more in line with the longitudinal axis of the rope. The speed of the drawing-off mechanism can still further be varied by a change of the gears at the rear end of the shaft Z.

If it is desired to lay the strands around the rope-core closer, or more in line with the transverse axis of the rope, while the twist or lay in the strands and cords remain unchanged, the spur-gear $s'$, which meshes with one of the pair of idle-gears $u$, is replaced by a larger gear to get an increased revolution of the main shaft, which will cause the rope-laying head C to lay the strands around the rope-core faster to get the increased twist or lay, as stated. This will be more apparent when it is remembered that the strand and cord shafts do not receive motion directly from the main shaft, but from the double gear-wheel V v, loose on the main shaft, as described. The operation of the machine to effect the laying or manufacture of tiller-rope is the same as that hereinbefore described, with the exception that the spools M on the strand-shafts E and the strand-wire-laying head F are not used, as a textile core running from the core-spool $d^3$ on each of the strand-shafts, through said hollow strand-shafts, is designed to be used as the strand-core. (See Fig. 7.)

It will be seen from the foregoing that the machine must be properly "threaded," as it is termed, and the wires carried to and around the drawing-off wheel and through the drawing-rolls 6, so that upon giving motion to the machine the laying operations at the cord-shafts, strand-shafts, and main shaft will begin simultaneously.

Having fully described the greatest capacity of my improved machine as forming the ropes shown and described, I would state that, because of the adjustability of many parts of the machine, as described hereinbefore, I am enabled to make various forms of rope of less magnitude than those shown and described, which will be apparent to those skilled in the art of rope-making.

In the machine herein described I prefer that the shafts I and E and the shaft B be made hollow to enable the passage through them and the centers of their laying-heads of cores, when said cores are desired; but the said shafts may be solid and the machine so produced be within the scope of my invention. The shafts I have their bearings in radial arms extended from the shafts E, and the shafts E have their bearings in radial arms extended from the main shaft B, and for facility of description and reference I shall hereinafter refer to the shafts I and E as shafts grouped radially.

In all other wire-rope-making machines known to me prior to this my invention the cords, composed of individual wires laid around a central core, have been made on a separate machine and, wound upon spools, have been placed in a second machine, which united the said cords to form strands, such as herein described, the said strands being united in this second machine to form a rope.

In this my invention I am enabled to perform on one machine and in one continuous operation work which has heretofore required two machines and two operations, and by forming the cords in the same machine which unites the cords to form strands and the strands to form the rope I am enabled to entirely do away with winding or spooling the cords, and all the wires, cords, and strands being held under a uniform tension and united at a continuous operation enables me to produce a rope more uniform in quality and which in use will stand greater strain.

The drawing-rolls, operating in connection with the drawing-off wheel 5, permit the rope to be severed between said rolls and a proper reeling device and the removal of the reel when filled with rope without thereby loosening the rope on the drawing-off wheel or stopping or interfering with the machine. These results are not incident to machines wherein the rope is delivered to the reeling device directly from the drawing-off wheel.

I am aware that it is not new to use a single guide-roll in connection with a drawing-off wheel to push aside the coils of rope on said wheel, and I do not wish to be understood as claiming such as my invention. I deem it necessary to partially lift at two or more points each coil of rope on the drawing-off wheel, as described, instead of pushing the coils bodily aside, and thereby prevent damage to the rope from abrasion and torsion.

As stated hereinbefore, this machine is adapted to manufacture rope of various sizes and constructions. As a means to this end a greater or less number of the wires on the spools on the smallest or cord shafts may be passed from the tension mechanism to and through the strand-laying heads and be laid around the strand-core, which latter may be constructed of a number of wires by means of the strand-core-laying mechanism; or, on the other hand, it may be a single textile or wire core, that may be wound on the strand-core spool. In this connection the laying-heads and core-spools on the cord-shafts are not used, and hence the former do not form an essential feature of my invention.

I do not here endeavor to cover or seek to claim any part of the processes which are more or less described in the foregoing specification, as said processes are fully described and claimed in an application filed by me on the 24th day of September, 1881, No. 42,468, for an improvement in the art of manufacturing wire ropes and cables.

Having thus described my invention, what I claim, and desire to secure by Letters Patent, is—

1. In a wire-rope-twisting machine, the rotating shafts grouped radially around strand-shafts, provided each with a laying-head and carrying a number of wire-bearing spools, a series of revolving strand-shafts grouped radially around a main shaft, a series of strand-laying heads, and a revolving main shaft provided at its forward end with a rope-laying head, in combination, substantially as and for the purpose set forth.

2. A number of rotating shafts grouped radially around strand-shafts, each provided with a laying-head and carrying a number of wire-bearing spools, a series of revolving strand-shafts grouped radially around a main shaft, a series of strand-laying heads, and a revolving hollow main shaft adapted to permit a rope-core to pass from a suitable reel through said shaft, and provided with a rope-laying head, in combination, substantially as and for the purpose set forth.

3. A number of rotating shafts grouped radially around strand-shafts, provided each with a laying-head and carrying a number of spools containing the individual wires, a series of revolving hollow strand-shafts grouped radially around a main shaft, and adapted to carry each a spool containing a core which is passed through said hollow shaft to the laying-head, a series of strand-laying heads, and a revolving hollow main shaft adapted to permit the passage of a rope-core through it to the main laying-head, said shaft provided with a main or rope-laying head, in combination, substantially as and for the purpose set forth.

4. A number of hollow shafts revolving on their own axes, radiating and revolving around strand-shafts, each adapted to carry a number of wire-bearing spools and a core-spool, and provided with a laying-head, a series of revolving strand-shafts and strand-laying heads, and a revolving main shaft provided with a rope-laying head, in combination, substantially as and for the purpose set forth.

5. A number of hollow shafts revolving on their own axes, radiating and revolving around the axes of strand-shafts, provided each with a laying-head, and adapted to carry a number of wire-bearing spools and a core-spool, a series of hollow strand-shafts rotating on their own axes, radiating and rotating around the axis of a main shaft, and each adapted to carry a strand-core spool, a series of rotating strand-laying heads, and a revolving main shaft provided with a rope-laying head, in combination, substantially as and for the purpose set forth.

6. A number of hollow shafts revolving on their own axes, radiating and revolving around the axes of the strand-shafts, each provided with a laying-head, and adapted to carry wire-bearing spools and a core-spool, a number of revolving hollow strand-shafts, each provided with a strand-core-laying head and adapted to carry a set of wire-bearing spools and a core-spool, a number of strand-laying heads, and a revolving main shaft provided with a rope-laying head, in combination, substantially as and for the purpose set forth.

7. A number of hollow shafts revolving on their own axes, radiating and revolving around the axes of strand-shafts, each provided with a laying-head, and adapted to carry a number of wire-bearing spools and a core-spool, a number of revolving hollow strand-shafts, each adapted to carry a core-spool and to permit the passage of a core through said shaft, a number of strand-laying heads, and a revolving hollow main shaft designed to permit the passage through it of a rope-core, and provided with a main or rope-laying head, in combination, substantially as and for the purpose set forth.

8. A number of hollow shafts revolving on their own axes, radiating and revolving around the axes of strand-shafts, each provided with a laying-head and adapted to carry a number of wire-bearing spools and a core-spool, a number of hollow strand-shafts radiating and rotating around a main shaft, each provided with a strand-core-laying head and adapted to carry a number of wire-bearing spools and a core-spool, a number of strand-laying heads, and a revolving hollow main shaft designed to permit the passage through it of a rope-core, and provided with a rope-laying head, in combination, substantially as and for the purpose set forth.

9. A number of hollow shafts revolving on their own axes, radiating and revolving around the axis of a strand-shaft, each adapted to carry a number of wire-bearing spools and a core-spool, and provided with a laying-head and tension mechanism to exert tensile strain directly on the individual wires after leaving the spools, a rotating hollow strand-shaft provided with a strand-core-laying head, and designed to carry a number of wire-bearing spools and a core-spool, and a strand-laying head, in combination, substantially as and for the purpose set forth.

10. A number of hollow shafts rotating on their own axes and revolving around the axes of strand-shafts, each adapted to carry wire-bearing spools and a core-spool, and provided with a laying-head and tension mechanism to exert tensile strain directly on the individual wires after leaving the spools, a number of hollow rotating strand-shafts, each constructed to carry a core-spool, a number of strand-laying heads, and a rotating hollow main shaft designed to permit the passage through it of a rope-core, and provided with a rope-laying head, in combination, substantially as and for the purpose set forth.

11. A number of shafts radiating and revolving around the axes of strand-shafts, each adapted to carry a number of wire-bearing spools, and provided with tension mechanism to exert tensile strain directly on the individual wires after leaving the spools, a number of hollow strand-shafts rotating on their own axes, radiating and rotating around the axis of the main shaft, and each adapted to carry a core-bearing spool, a number of strand-laying heads, and a revolving main shaft provided with a rope-laying head, in combination, substantially as and for the purpose set forth.

12. A number of shafts radiating and revolving around the axes of strand-shafts, each adapted to carry a number of wire-bearing spools, and provided with tension mechanism to exert tensile strain directly on the individual wires after leaving the spools, a number of hollow strand-shafts rotating on their own axes, radiating and revolving around the axis of the main shaft, and each adapted to carry a core-bearing spool, a number of strand-laying heads, and a revolving hollow main shaft provided with a rope laying head and adapted to permit the passage through it of a rope-core, in combination, substantially as and for the purpose set forth.

13. A number of cord-shafts radiating and revolving around the axes of strand-shafts, each adapted to carry a number of wire-bearing spools, and provided with tension mechanism to exert tensile strain directly on the individual wires after leaving the spools, a series of strand-shafts revolving on their own axes, and a series of strand-laying heads and spiders arranged forward of said strand-shafts, whereby as the strands are laid the wires entering the strand-laying heads will be evenly laid into the strands, in combination, substantially as and for the purpose set forth.

14. A number of cord-shafts rotating on their own axes, radiating and revolving around the axes of strand-shafts, each adapted to carry a number of wire-bearing spools, and provided with a laying-head and a tension mechanism to exert tensile strain directly on the individual wires after leaving the spools, a series of strand-shafts revolving on their own axes, and a series of strand-laying heads and spiders arranged forward of said strand-shafts, whereby as the strands are laid the cords entering the strand-laying heads will be evenly laid into the strands, in combination, substantially as and for the purpose set forth.

15. A number of cord-shafts radiating and rotating around strand-shafts, each adapted to carry a number of wire-bearing spools, and provided with tension mechanism to exert tensile strain directly on the individual wires after leaving the spools, a series of strand-shafts rotating on their own axes, radiating and rotating around the axis of a main shaft, a series of strand-laying heads and spiders rotating with the strand-shafts and arranged forward of said shafts, whereby as the strands are spun the wires entering the strand-laying heads will be evenly laid into the strand, and a revolving main shaft provided with a rope-laying head and die, in combination, substantially as and for the purpose set forth.

16. The combination, with a hollow shaft provided with the loose disk and ring, and a plate bearing against the face of the disk and its ring, of a tube inserted in the hollow shaft, and provided with a key at its forward end abutting against the plate, the said tube having its rear end exteriorly screw-threaded and provided with a thumb-nut and coil-spring, as described, and for the purpose set forth.

17. The combination, with a shaft having the loose disk with its ring, of two plates secured to the shaft, one in front and the other in rear of the loose disk, and provided each with projecting fingers, arranged with relation to each other substantially as described, whereby the individual wires are caused to pass between the loose disk and its ring at an angle to the line of draft, substantially as and for the purpose set forth.

18. The combination, with a shaft provided at its forward end with a laying-head, of one or more spool-holders having radiating arms to contain the spools, and adjustably secured to said shaft, so that the arms may be arranged with relation to one another and to the laying-head substantially as and for the purpose set forth.

19. The combination, with a shaft provided at its forward end with a laying-head, of two or more spool-holders removably secured to said shaft, and each having radiating arms to contain the spools, said arms inclining forwardly with relation to the laying-head, substantially as described.

20. A spool-holder having hollow radiating arms provided each with a spring-retaining pin, $l'$, and a spring-button to retain the wire-bearing spools on said arms and prevent the rotation of said spools as against the spring of the wire, as described.

21. A strand-shaft provided with a strand-core-laying head composed of the parts $f f^4$, as described, the spool-carriers, the spider, tube, thumb-nut, and coil-spring, as shown and described.

22. The combination, with a group of cord-shafts, each provided with spool-carriers having arms adapted to carry wire-bearing spools, of a hollow strand-shaft provided with a strand-core-laying head, and spool-carriers having arms adapted to carry wire-bearing spools, said shaft adapted to carry a spool containing a core which may be passed through said hollow shaft to the strand-core-laying head, and a strand-laying head, substantially as and for the purpose set forth.

23. The combination, with a group of cord-shafts, each provided with spool-carriers having arms adapted to carry wire-bearing spools, said shafts having tension mechanism to exert an unvarying tensile strain directly on the individual wires, of a hollow strand-shaft provided with a strand-core-laying head, and spool-carriers having arms adapted to carry wire-bearing spools, said shaft adapted to carry a spool containing a core, which may be passed through said hollow shaft to the strand-core-laying head, and a strand-laying head, substantially as and for the purpose set forth.

24. The combination, with a revolving main shaft having two series of arms supporting a series of strand-shafts and strand-laying heads, the strand-shafts provided with the bevel-gears and the strand-laying heads, of the double gear-wheel working loosely on a bearing of said main shaft and receiving motion independently of said shaft, and the shafts secured to the back of the main series of arms, provided with bevel-gears at both ends, substantially as and for the purpose set forth.

25. The combination, with the main shaft, a spur-gear thereon, a sleeve mounted on the main shaft, and an arm, and idle-gears mounted on said arm, adapted to mesh with the gear on the main shaft, of an auxiliary shaft parallel with the main shaft, and provided with a spur-gear adapted to engage with the said idle-gears, and a standard with which said arm may be adjustably connected, substantially as set forth.

26. The combination, with a shaft provided with a laying-head adapted for the passage of a rope or other twisted article therethrough, of a rotating wheel adapted to receive and draw the rope from said shaft, and means for partially lifting the coil or coils of rope at two or more points around the periphery of said wheel, substantially as set forth.

27. The combination, with a shaft provided with a laying-head adapted for the passage of a rope or other twisted article therethrough, of a rotating wheel so arranged in relation to said shaft that the rope or other article may be passed one or more times around the periphery of said wheel and be drawn from the shaft, a pair of rolls, and suitable known mechanism for imparting to said rolls a surface speed substantially equal to that of the wheel, so as to hold the rope taut on said wheel and take said rope from the wheel as it is drawn thereon, substantially as set forth.

28. The combination, with a shaft provided with a laying-head adapted for the passage of a rope or other twisted article therethrough, of a rotating wheel adapted to receive and draw the rope from the shaft, means to prevent overlapping of the rope, and a pair of rolls, and suitable known mechanism for imparting to said rolls a surface speed substantially equal to that of the wheel, so as to hold the rope taut on said wheel and take said rope from the wheel as it is drawn thereon, substantially as set forth.

29. The main shaft and its laying-head, and the rotating wheel to receive about its surface the rope delivered from said laying-head, combined with two or more inverted truncated cones, supported each upon an inclined axial pin, and having a peripheral groove or grooves to receive the rope, as described, said cones arranged with relation to the periphery of the rotating wheel substantially as described, and for the purpose set forth.

30. The combination of a drawing-off wheel and the peripheral grooved inverted truncated cone, having the described bottom or working surface of said groove or grooves at right angles to the longitudinal axis of said cone, as and for the purpose set forth.

31. A drawing-off wheel and a pair of oppositely-revolving shafts parallel to each other, provided with drawing and compression rolls, and having means for their adjustment, said shafts and drawing-off wheel having a fixed relative speed, in combination, substantially as set forth.

32. The shaft 8, frames 1 and 3, shaft 7, swinging frame 9, swinging dog 10, pivoted to frame 3, set-screw 11, and stud 12, in combination, as shown and described.

33. The shaft Z', having at one end a miter-gear, frame 1, frame 3, having shaft 2, provided with the miter and spur gears, as shown, shaft 4, having a spur-gear, shaft 8, provided with a spur-gear, swinging frame 9, having stud 12, shaft 7, and spur-gear, and the swinging dog 10, having set-screw 11, in combination, substantially as shown and described.

34. The combination, with the revolving main shaft B, of shaft Z, receiving motion relative to the motion of the main shaft, suitable gearing for connecting shafts B and Z to shaft S from the shaft s, from which motion is imparted to the main shaft, the shaft s, shafts 2 and 4, connected by suitable gearing to shaft Z' and drawing-wheel 5, the connecting-gearing, shaft Z', the worm and its gear, and drawing-wheel 5, provided with the teeth, as shown, substantially as described, and for the purpose set forth.

In testimony whereof I affix my signature in presence of two witnesses.

FREDERICK A. WISWELL.

Witnesses:
C. E. HAMBLER,
E. J. TINKER.